United States Patent [19]

Wanstreet et al.

[11] 4,015,624
[45] Apr. 5, 1977

[54] TIRE VALVE

[75] Inventors: Gregory E. Wanstreet, Canal Fulton; C. Lucas Plaat, Troy, both of Ohio

[73] Assignee: The B.F. Goodrich Company, Akron, Ohio

[22] Filed: Aug. 27, 1975

[21] Appl. No.: 608,061

Related U.S. Application Data

[63] Continuation of Ser. No. 407,920, Oct. 19, 1973, abandoned.

[52] U.S. Cl. .................. 137/224; 137/232; 137/467; 137/855; 220/209
[51] Int. Cl.² .......................... F16K 15/20
[58] Field of Search ....... 137/223, 224, 232, 512.3, 137/525.3, 543.21, 467, 557; 220/89 A, 339, 209; 138/89, 89.1, 89.2, 89.3, 89.4; 116/34, 65, 125

[56] References Cited

UNITED STATES PATENTS

| | | | |
|---|---|---|---|
| 1,006,159 | 10/1911 | Wetherholt | 137/224 |
| 1,355,230 | 10/1920 | Kaiser | 137/224 |
| 1,460,775 | 7/1923 | Walsh | 137/232 X |
| 1,597,455 | 8/1926 | Mills | 137/224 X |
| 2,334,095 | 11/1943 | Hoghaug | 116/34 R |
| 2,697,915 | 12/1954 | Chisholm | 137/543.21 X |
| 2,967,508 | 1/1961 | Hovorka | 116/34 R |
| 3,308,847 | 3/1967 | Umann | 137/505.42 X |
| 3,443,712 | 5/1969 | Hauser | 220/339 X |
| 3,728,848 | 4/1973 | Vest | 138/89.2 X |
| 3,844,310 | 10/1974 | Brindisi | 137/557 |

*Primary Examiner*—Harold W. Weakley
*Attorney, Agent, or Firm*—Joseph Januszkiewicz; W. A. Shira, Jr.

[57] ABSTRACT

A valve assembly having a pair of flow passages in fluid communication with a chamber leading to a tire. One of the passages contains a typical one-way valve core mechanism while the other passage contains a pressure release mechanism. The cross sectional area of the tire inflation passage is less than the cross sectional area of the passage leading from the chamber to the pressure release bore. The openings at the ambient pressure ends of the valve bores are unobstructed for ready access to the valve mechanisms.

1 Claim, 5 Drawing Figures

U.S. Patent
April 5, 1977
4,015,624
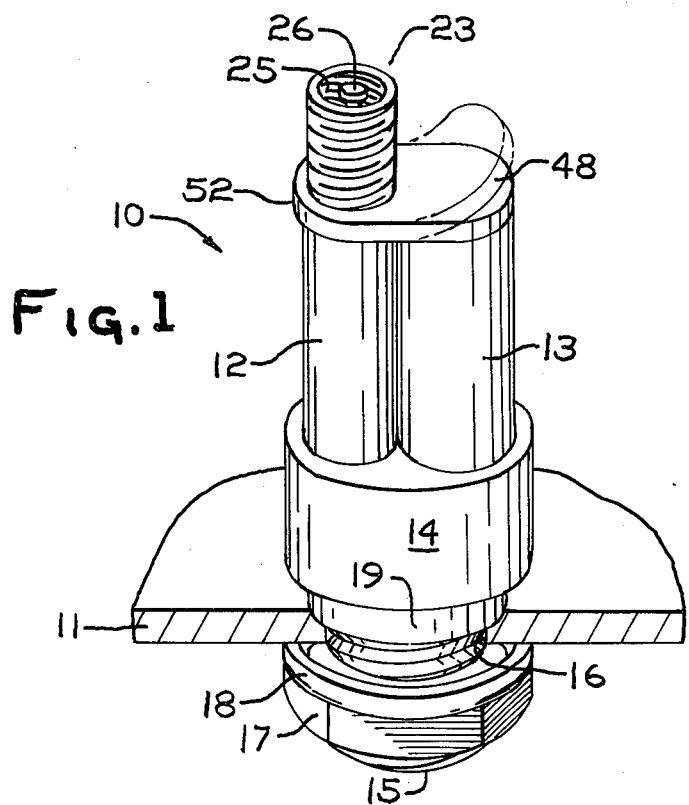
Fig. 1
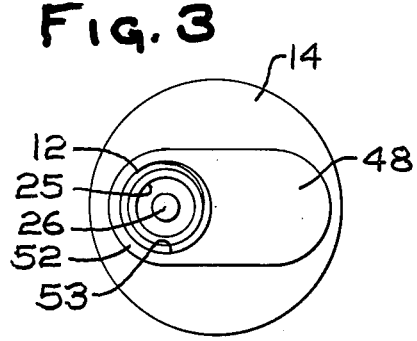
Fig. 3
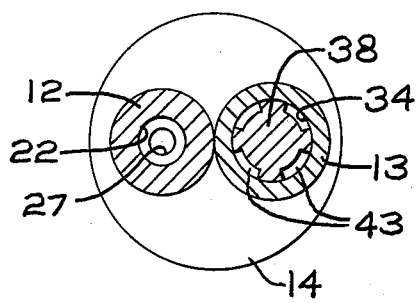
Fig. 4
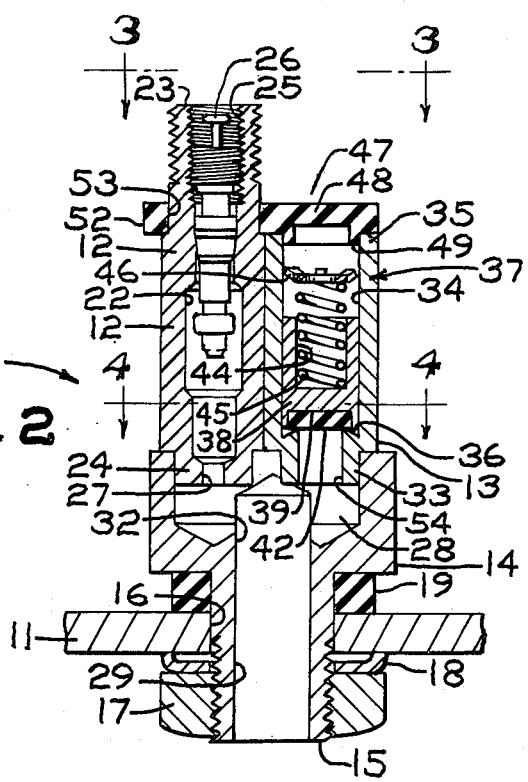
Fig. 5
Fig. 2

TIRE VALVE

This is a continuation of application Ser. No. 407,920, filed Oct. 19, 1973, now abandoned.

BACKGROUND OF THE INVENTION

This invention relates to a tire valve for inflating a tire wheel assembly and for preventing over-inflation and subsequent bursting of the tire during inflation or in road use. Normally tires are inflated up to a safe operating pressure; however, the inflating equipment may have the capacity to overinflate the tire with an inflating medium at an excessively high pressure. This creates a hazard for personnel in the area of the tire during inflation if the tire should burst at that time. The valve of this invention is also useful to release excessive tire pressure which might be developed in service.

Prior to the present invention, safety relief valves have been devised in which pressure release devices were incorporated in the valve stem; however, their design has been expensive to manufacture and difficult to adjust and service. Accordingly, it has not been practical to provide valves of this design on the number of installations where this safety feature is desirable. With the safety valve designs proposed heretofore, the valve stems have had an increased length to accommodate the additional mechanism and this has made the valves more vulnerable to damage. There has also been a problem in servicing and adjusting the pressure release mechanism because it was incorporated in the same valve stem as the inflation valve core. In addition, there was no visible indication that the pressure release mechanism had been actuated and accordingly the tire may have been put into use in an underinflated condition. There was also the problem of releasing the inflating medium from the tire at a rate exceeding the inflation rate to effectively prevent overinflation.

SUMMARY OF THE INVENTION

The tire valve of this invention provides an assembly in which the valve has a total length substantially the same as a standard valve stem but is of substantially greater strength. The valve body mounts a tire inflation valve mechanism and a pressure release mechanism in separate passages, both of which are in fluid communication with each other and with the tire through a chamber in the valve body. By mounting the inflation valve core in one passage and the pressure release mechanism in the other passage, quick and easy access may be had to these mechanisms for assembly and maintenance. This is especially important with respect to the pressure release mechanism which must be adjusted for actuation at a predetermined pressure. The relative cross sectional areas of the inflation passage and pressure relief passage are selected so that it is impossible to apply more pressure to the tire than is required to actuate the pressure release mechanism, even if the source pressure is not removed when the pressure release mechanism is actuated.

A visible indication that overinflation has occurred and the pressure release mechanism has been actuated is provided through the use of a dust cap on the pressure release bore which is lifted out of the exhaust port upon actuation of the pressure release mechanism. This cap is hinged to the valve body and may be readily replaced in the port at the end of the pressure release bore.

The accompanying drawings show one preferred form of tire valve assembly built in accordance with and embodying the invention.

BRIEF DESCRIPTION OF THE DRAWINGS

FIG. 1 is a perspective view of the tire valve assembly mounted on the wheel rim with parts being sectioned and broken away, and showing in broken lines the position of the dust cap after actuation of the pressure release mechanism.

FIG. 2 is a longitudinal cross sectional view of the valve assembly of FIG. 1.

FIG. 3 is a top plan view of the tire valve assembly shown in FIGS. 1 and 2 taken along the plane of line 3—3 of FIG. 2.

FIG. 4 is a sectional view taken along the plane of line 4—4 of FIG. 2.

FIG. 5 is a plan view of the star washer shown in FIG. 2.

DETAILED DESCRIPTION

Referring to FIG. 1, tire valve assembly 10 is shown installed on a wheel rim 11 with a cylindrical inflation casing 12 and a cylindrical pressure release casing 13 extending outwardly from a valve body member 14. A threaded shank 15 extends through a rim hole 16 in the rim 11 and a nut 17 is threaded on the shank for clamping the valve body member 14 to the rim.

As shown more clearly in FIG. 2, a spring washer 18 may be interposed between the nut 17 and rim 11 and a sealing washer 19 of rubberlike material may be interposed between the valve body member 14 and rim for clamping the valve body member to the rim in sealing engagement. The shank 15 could also be fastened to the rim 11 by other means such as a rubber snap-in type of connection.

The cylindrical inflation casing 12 has an inflating passage or inflation bore 22 extending from an outer end 23 to an inner end 24 of the casing which is inset in the valve body member 14. The outer end 23 of the inflation casing 12 is threaded and has an outer connecting port 25 for connection to a source of inflating medium under pressure such as an air hose connected to a compressor or a bottle of compressed air or other suitable gas. A valve core 26 of a type well known in the art may be threaded in the inflation bore 22 to communicate the inflating medium from the outer end 23 to the inner end 24 of the inflation casing 12 and prevent flow of the inflating medium in the other direction.

An inflation port 27 at the inner end 24 of the inflation casing 12 provides an opening through which the inflating medium is conducted to a chamber 28 in the valve body member 14. The shank 15 contains a tire connecting passage 29 for communicating tire inflating medium from the chamber 28 through a tire passage port 32 to the tire cavity within the rim 11 and the tire mounted on the rim (not shown).

The cylindrical pressure release casing 13 extends alongside the inflation casing 12 and has an inner end 33 inset in the valve body member 14. The pressure release casing 13 includes a relief passage such as pressure release bore 34 extending from an outer end 35 to a valve seat 36 close to the inner end 33 of the casing 13.

The pressure relief passage is comprised of pressure relief port 54 leading from chamber 28 to a pressure release bore 34 with a pressure release valve mechanism 37 disposed between port 54 and bore 34. The bore 34 empties to the atmosphere through exhaust port 47.

A pressure release valve mechanism 37 adapted for reciprocating sliding movement in the pressure release bore 34 has a piston 38 with a face 39 disposed towards the chamber 28 of the valve body member 14. A seal 42 of rubberlike material is mounted on the face 39 for sealing engagement with the valve seat 36. As shown more clearly in FIG. 4, the outer cylindrical surface of the piston 38 has longitudinal grooves 43 for bypassing the inflating medium through the pressure release bore 34, when the pressure release valve mechanism 37 is in the open position.

On the opposite side of the piston 38 from the seal 42, a cavity 44 is provided in the piston for receiving a coil spring 45 extending toward the outer end 35 of the pressure release casing 13. A star washer 46, shown in FIGS. 2 and 5, which may be inserted through outer end 35 of the casing 13, engages the coil spring 45 at a predetermined position providing the desired force to bias the seal 42 of piston 38 against the valve seat 36. The star washer 46 is shaped to grip the walls of the relief bore 34 and retain the coil spring 45 in a compressed condition.

An exhaust port 47 is provided at the outer end 35 of the pressure release casing 13 for dissipating the inflating medium from the pressure release bore 34 to the atmosphere. A cap member such as dust cap 48 of resilient rubberlike material may be provided to close the exhaust port 47 when the pressure release valve mechanism 37 is closed. The dust cap 48 may have a cylindrical plug portion 49 extending into the exhaust port 47 with a press fit yieldably holding the dust cap in position but permitting the inflating medium to force the cap out of the exhaust port when the pressure release valve mechanism 37 is opened. The position of the dust cap, after actuation of the pressure relief valve is illustrated in broken lines in FIG. 1. The dust cap 48 may have an extension 52 with an aperture 53 adapted for sliding over the outer end 23 of the inflation casing 12 to retain the dust cap when it is biased away from the exhaust port 47.

At the inner end 33 of the pressure release casing 13, a relief port 54 for communicating inflating fluid between the pressure release bore 34 and chamber 28 is provided. As shown in FIG. 2, the inflation port or passage 27 has a cross sectional area less than the cross sectional area of the relief port 54 which is important to insure that the tire overinflation is released at a rate exceeding the inflation rate.

The pressure release piston area at the face 39 of piston 38, in the closed position, is less than the effective piston area at the face in the open condition of the valve mechanism. In this regard it will be noted that the diameter of the bore 34 is greater than the diameter of the relief port 54. The diameter, or area, of the relief port 54 determines the effective area of face 39 upon which inflation pressure bears when the relief valve is in the closed position. It will be noted that seal 42 overlies the valve seat 36. However, when face 39 is moved away from the valve seat 36, the entire area of the end face of the fluted piston 38 becomes effective. The total net area of the end of face 39 of piston 38 is greater than the cross sectional area of relief port 54. Accordingly, the total force exerted upon the piston 38 in the open position is greater than that in the closed position, for a given unit pressure in the chamber 28 and relief port 54. It necessarily follows that the pressure relief valve will remain open with a lower unit pressure than is required to open it initially. For example, a typical valve is constructed to open at 40 p.s.i.g. and close at 38 p.s.i.g.

The inflation port 27 and the relief port 54 are on one side of the chamber 28 while the tire passage port 32 is on the other side of the chamber providing a substantially direct flow of inflating medium into the tire cavity during inflation through the inflation port and a substantially direct flow of the inflating medium from the tire cavity through the pressure release bore 34 in the event of overinflation. This construction also minimizes the possibility of actuating the pressure release valve mechanism 37 due to surges in the flow of inflating medium into the tire cavity.

The tire valve assembly 10 may be manufactured by fabricating the casings 12 and 13 and the valve body member 14 separately and then assembling them, as shown in FIG. 2. The complete assembly 10 can then be brazed together into a unitary structure. The assembly 10 may also be made of one piece as by casting or forging. In any case, the parallel side-by-side casings 12 and 13 provide a reinforced structure capable of withstanding hard usage on the road. Furthermore, ready access through the outer connecting port 25 to the inflation bore 22 and through the exhaust port 47 to the pressure release bore 34 may be had to service and adjust the valve core 26 and pressure release valve mechanism 37.

In installation of the tire valve assembly 10, the shank 15 is inserted through the rim hole 16 and the nut 17 screwed on the threaded portion of the shank.

The force of the fluid pressure working upon the effective relief piston area at face 39 overcomes the biasing force of the spring 45 to move the piston away from the valve seat 36 to thereby vent the inflating medium through the grooves 43. The dust cap 48 is then lifted out of the exhaust port 47 and the inflating medium exhausted into the atmosphere. Due to the difference in effective piston areas of the pressure relief seal 42 between the open position and the closed position, more pressure is required to initially actuate the pressure release mechanism 37 than is required to maintain it in the exhaust position. Accordingly, the pressure release valve mechanism 37 remains in the open position until such time as the pressure in the tire drops to a predetermined level below valve actuation or exhaust pressure. The actual relationship between the pressure required to open and the lesser pressure permitting the exhaust valve to close is determined, for the most part, by the difference in effective piston areas between the open and closed positions of the valve.

Upon actuation of the pressure release valve mechanism 37, the inflating medium continues to pass through the pressure release bore 34 until the spring 45 forces the piston 38 into the closed position. In a preferred embodiment, the piston 38 will return to the closed position when the inflating medium is reduced to approximately 80 percent of the predetermined pressure required to open it. Accordingly, in most cases the pressure relief valve will remain open, in the exhaust position, until the source of inflating pressure is removed from the outer end of inflation casing 12. In a specific example of a valve constructed and operated according to the teachings of this invention, a source pressure of 150 p.s.i.g., for example, causes the pressure release mechanism to actuate or open at about 40 p.s.i.g. and reseal at about 38 p.s.i.g. when the inflation source is removed. The same valve will "fully vent," i.e. remain continuously open, at 55 p.s.i.g. so that the inflation pressure in the associated tire could not ever exceed 55 p.s.i.g. The piston 38 is designed to provide a long guiding action against the pressure release bore 34 and provides a positive and repeatable closing of the valve seat 36 by seal 42.

The star washer 46 which grips the wall of the pressure release bore 34 is positioned at a predetermined location to yield the desired spring force necessary to obtain the proper release and resealing force of the valve mechanism 37. The dust cap 48 protects the pressure release valve mechanism 37 from dirt and foreign matter while in use but does not hamper the operation of the valve mechanism. The dust cover 48 also indicates to the user that the pressure release valve mechanism 37 has been actuated and thereby provides a visual indicator that overinflation has occurred.

It is a common practice to inflate tires without employing a valve core in order to reduce inflation time. For this reason the valve of this invention provides the inflation bore 27 with a size such that the rate of flow is restricted to essentially that which would be allowed if a valve stem were properly installed. This restricted passage 27 is also especially desirable for the inflation of foldable tires which are molded in the flat folded condition and therefore create a greater back pressure due to the resiliency of the tire. Foldable spare tires are also inflated by portable pressure bottles, and it is especially desirable to have a pressure release valve mechanism which will retain the inflating medium after the pressure is reduced because of the limited supply of inflating medium in the pressure bottle. The tire valve assembly 10 of this invention may be used on all types of tires and also on other pressure vessels where the problem of overinflation exists.

I claim:

1. Valve means for a pneumatic tubeless tire mounted upon a vehicle wheel rim, said valve means comprising an elongated body provided with means on one end for securing the body in operating position, the said body having a chamber therein disposed adjacent the said one end with a first passageway in communication with and extending from one side of said chamber through the said one end of said body, said chamber communicating with a pair of parallel generally cylindrical passageways, said parallel passageways in communication with and extending from the opposite side of said chamber through the opposite end of said body, a valve core in one of said pair of passageways permitting fluid under pressure to be introduced or exhausted therethrough, a valve seat of lesser diameter than the internal diameter of said other of the pair of passageways surrounding the communating opening between the latter passageway and said chamber, a cylindrical piston slidably in the said other pair of passageways with one end of said piston for abuttingly contacting said valve seat in fluid sealingly relationship, a compression spring disposed in said other of said pair of passageways with one end of the spring disposed in an axial bore provided in the other end of said piston, a perforate member engaging the other end of said spring, said perforate member having peripheral portions gripping the sidewall of the passageway in which the spring is located for retaining said perforate member at a selected position and thereby provide a preselected compression of said spring, said piston having fluid passageways axially thereof radially outwardly of the end area which sealingly engages said valve seat, the cross-sectional area available for fluid passage into said chamber from said one of said pair of passageways being less than that for exhaust of fluid from said chamber through the other of said pair of passageways when the piston is displaced from said valve seat, an imperforate flexible dust cap means normally closing said other of said pair of passageways at the end thereof opposite said chamber, said dust cap means being displaceable by fluid under pressure exiting from said chamber when said piston is displaced from said valve seat, means for retaining said flexible dust cap means upon said body in said displaced condition to indicate a release of pressure, said cap means and retaining means are formed integrally of resilient deformable material with a part thereof frictionally held in the outer end of said other of said pair of passageways and a further part embracing an external portion of said body.

* * * * *